United States Patent
Maurio et al.

(10) Patent No.: US 9,015,655 B2
(45) Date of Patent: Apr. 21, 2015

(54) GENERATING A DIVERSE PROGRAM

(71) Applicant: Northrop Grumman Systems Corporation, Falls Church, VA (US)

(72) Inventors: Joseph Michael Maurio, Westminster, MD (US); Christopher Todd McClure, Sykesville, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 281 days.

(21) Appl. No.: 13/655,712

(22) Filed: Oct. 19, 2012

(65) Prior Publication Data

US 2014/0115568 A1    Apr. 24, 2014

(51) Int. Cl.
*G06F 9/44* (2006.01)
*G06F 9/45* (2006.01)

(52) U.S. Cl.
CPC . *G06F 8/447* (2013.01); *G06F 8/41* (2013.01)

(58) Field of Classification Search
None
See application file for complete search history.

(56) References Cited

U.S. PATENT DOCUMENTS

| | | | |
|---|---|---|---|
| 7,146,530 B2 | 12/2006 | Pomaranski et al. | |
| 7,197,748 B2 | 3/2007 | Chaiken et al. | |
| 7,512,936 B2 * | 3/2009 | Schneider et al. | 717/136 |
| 2001/0037445 A1 | 11/2001 | Mukherjee | |
| 2001/0037448 A1 | 11/2001 | Mukherjee et al. | |
| 2011/0099439 A1 | 4/2011 | Brewerton et al. | |

OTHER PUBLICATIONS

Bernardi, et al.: "*A New Hybrid Fault Detection Technique for Systems-on-a-Chip*", IEEE Transactions on Computers, vol. 55, No. 2, Feb. 2006 pp. 185-198.

Franz: "E Unibus Pluram: *Massive-Scale Software Diversity as a Defense Mechanism*", Donald Bren School of Information and Computer Science, University of California, Irvine, CA, pp. 1-17.

Han, et al.: "*On the Effectiveness of Software Diversity: A Systematic Study on Real-World Vulnerabilities*", School of Information Systems, Singapore Management University, U. Flegel and D. Bruschi (Eds.): DIMVA 2009, LNCS 5587m pp. 127-124, 2009.

Michael, et al.: "*Opportunism and Diversity in Automated Software Test Data Generation*"; Technical Report RSTR-0003-97-13, RST Corporation, pp. 1-16.

* cited by examiner

*Primary Examiner* — Chuck Kendall
(74) *Attorney, Agent, or Firm* — Tarolli, Sundheim, Covell & Tummino LLP

(57) ABSTRACT

A system for generating a diverse program can include a diversification unit configured to generate the diverse program that can include a given set of instructions implemented as machine code and/or assembly language instructions based on a compiled program. The compiled program can include another set of instructions implemented as machine code and/or assembly language instructions.

20 Claims, 6 Drawing Sheets

GENERATING A DIVERSE PROGRAM

TECHNICAL FIELD

This disclosure relates to a diverse program. More particularly, this disclosure relates to systems and methods for generating a diverse program based on a compiled program.

BACKGROUND

Machine code or machine language is a system of atomic instructions executed directly by a processing unit. Each instruction performs a specific task, typically either an operation on a unit of data (in a register or in memory, such as add or move), or a jump operation (deciding which instruction executes next, often conditional on the results of a previous instruction). A compiled program can be made up of a series of these atomic instructions. Machine code may be regarded as a hardware-dependent programming language or as the lowest-level representation of a compiled and/or assembled program.

Assembly language is a low-level programming language for a computer, microcontroller, or other programmable device, in which each statement corresponds to a single machine code instruction. Each assembly language is specific to a particular computer architecture. Assembly language can be converted into executable machine code by a utility program referred to as an assembler; the conversion process is referred to as assembly, or assembling the code.

SUMMARY

Figure 1:
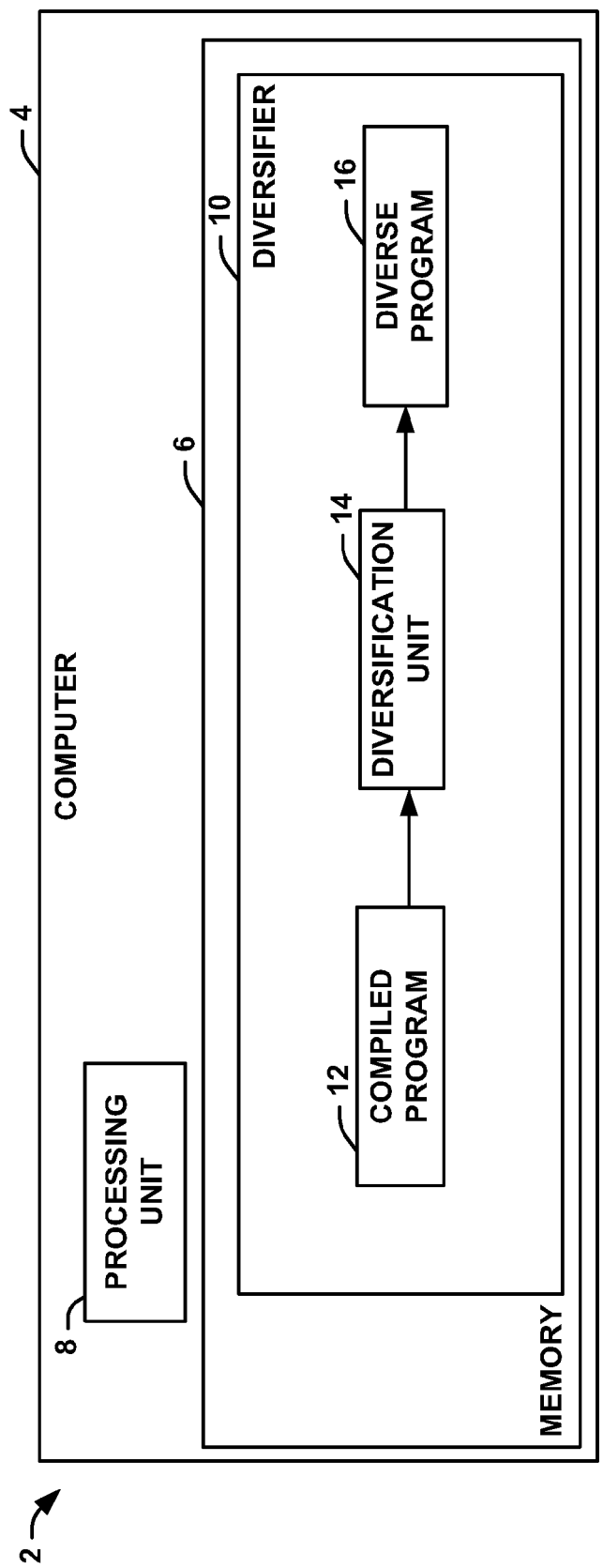
FIG. 1 illustrates an example of a system for generating a diverse program.

One example is related to a system for generating a diverse program. The system can include a memory configured to store machine readable instructions. The system can also include a processing unit configured to access the memory and execute the machine readable instructions. The machine readable instructions can include a diversification unit configured to generate the diverse program that includes a given set of instructions. The instructions of the diverse program can be machine code and/or assembly language instructions based on a compiled program. The compiled program can include another set of instructions implemented as machine code and/or assembly language instructions. The diverse program and the compiled program can both be configured to provide a given output value in response to a given input value.

Another example is related to a system for generating a diverse program that can include a computer. The computer can include a memory configured to store machine readable instructions. The computer can also include a processing unit configured to access the memory and execute the machine readable instructions. The machine readable instructions can include a diversification unit configured to generate the diverse program including a given set of instructions implemented as machine code and/or assembly language instructions based on a compiled program, the compiled program including another set of instructions implemented as machine code or assembly language instructions. The diversification unit can include a hardware diversifier configured to generate a given instruction of the given set of instructions based on an instruction of the other set of instructions. The given instruction and the other instruction can be configured to perform the same function and access different registers and/or different memory locations. The diversification unit can also include a temporal diversifier configured to generate a given series of instructions of the given set of instructions based on another series of instructions of the other set of instructions. The given series of instructions and the other series of instructions can be configured to perform the same function with a different order of execution.

Yet another example is related to a non-transitory computer readable medium having instructions executable by a processor for performing a method. The method can include generating a diverse program based on a compiled program. The diverse program and the compiled program can each include instructions implemented as machine code instructions and/or assembly language instructions. The diverse program and the compiled program can be configured to provide a given output value in response to a given input value. The compiled program and the diverse program can have different instructions

DETAILED DESCRIPTION

Microdiversity can be employed to increase fault tolerance of a system. To implement microdiversity, a diverse program can be generated from a compiled program. Both the diverse program and the compiled program can be implemented as low level computer instructions, such as machine code and/or assembly language instructions. The diverse program can be generated by a diversification unit that can parse the compiled program and implement hardware diversity, temporal diversity and/or algorithmic diversity.

One example can include a system 2 for implementing microdiversity. The system 2 can include a computer 4 that can include a memory 6 to store machine (e.g., computer) readable instructions. The memory 6 could be implemented, for example, as a non-transitory computer readable medium, such as volatile or non-volatile memory or a combination thereof. In some examples, the memory 6 can be implemented as a hard disk drive, a solid state drive, flash memory, random access memory, etc. The computer 4 can also include a processing unit 8 to access the memory 6 and execute the machine readable instructions. The processing unit 8 can be implemented, for example, as a processor core.

The memory 6 can include, for example, a diversifier 10 that can provide microdiversity. The diversifier 10 can receive a compiled program 12. The compiled program 12 can be implemented, for example, as a set of low level computer instructions in machine code and/or in assembly language. The compiled program 12 can be generated, for example, by a compiler. For instance, in one example, a program can be written in a high-level computer programming language, such as C++, C#, Java, Basic, etc. The compiler can convert (e.g., compile) the program into the compiled program 12.

The compiled program 12 can be provided to a diversification unit 14 that can generate a diverse program 16. The diverse program 16 can be implemented in the same level of code as the compiled program 12. For example, if the compiled program 12 is implemented as low-level machine code, the diverse program 16 can be implemented as low-level machine code as well. Additionally or alternatively, if the compiled program 12 is implemented as assembly language instructions, the diverse program 16 can be implemented as assembly language instructions as well. The diverse program 16 can operate in a manner such the providing the same input values to the compiled program 12 and the diverse program 16 can generate the same output values at both the compiled program 12 and the diverse program 16. However, the diverse program 16 can be generated in a manner that the input values to the diverse program 16 are manipulated and analyzed differently than the compiled program 12. Further, in some examples described herein, the diversification unit 14 can generate two different diverse programs based on the compiled program 12.

In one example, the diversification unit 14 can implement hardware diversity. To implement hardware diversity, the diversification unit 14 can parse the compiled program 12 and reallocate registers and/or random access memory (RAM) locations employed by each instruction of the compiled program 12 to generate the diverse program 16. For instance, to generate a given instruction for the diverse program 16 based on another instruction in the compiled program 12, the diversification unit 14 can alter the memory location and/or register location of the given instruction, while maintaining the parameters (e.g., arguments) of the other instruction in the given instruction. In this manner, such reallocation of registers and/or memory can ensure that non-transient failure in one register and/or one RAM location would not affect a machine code instruction and/or assembly language instruction of both the compiled program 12 and the diverse program 16.

In some examples, to implement register reallocation, the compiled program 12 can be programmed to employ a given half of available registers, while the diversification unit 14 is set to generate the diverse program 16 to employ another half of the available registers such that a non-transient failure of one register cannot affect any single instruction of both the compiled program 12 and the diverse program 16. Additionally or alternatively, in some examples, to implement the memory reallocation, the compiled program 12 can be programmed to employ a given half of available memory while the diversification unit 14 can be configured to generate the diverse program 16 to employ another half of the available memory such that a non-transient failure of one memory location cannot affect any single instruction of both the compiled program 12 and the diverse program 16. In examples where more than one memory devices are available, each of the compiled program 12 and the diverse program 16 can be configured to employ mutually exclusive subsets of the more than one memory device.

In another example, the diversification unit 14 can implement temporal diversity. To implement temporal diversity, the diversification unit 14 can parse the compiled program 12 and can employ different time-ordering sequences to perform a series of operations to generate the diverse program 16. For instance, the diversification unit 14 can generate a given series of instructions for the diverse program 16 based on another series of instructions in the compiled program 12. The given series of instructions can be implemented as the same instructions as the other series of instructions, but in different orders of execution. By implementing temporal diversity, timing issues and/or race conditions resulting from asynchronous communication and/or design flaws in hardware components in addition to transient conditions in input and output signal can be reduced or eliminated.

In yet another example, the diversification unit 14 can implement algorithmic diversity. To implement algorithmic diversity the diversification unit 14 can parse the compiled program 12 and replace processing logic and/or algorithms in the compiled program 12 with different processing logic and/or different algorithms that perform the same logical function for the diverse program 16. In some examples, algorithmic diversity can be a combination of hardware and temporal diversity.

In some examples, a combination of hardware diversity temporal diversity and algorithmic diversity can be employed by the diversification unit 14 to generate the diverse program 16. Moreover, the compiled program 12 and the diverse program 16 can be employed, for example, in a safety system, such as a nuclear reactor. For instance, as noted above, the same input value to both the compiled program 12 and the diverse program 16 results in the same output value. In an example where the compiled program 12 and the diverse program 16 are employed on a safety system, the output value of both the diverse program 16 and the compiled program 12 can represent activation of a safety device (e.g., a solenoid) in response to detection of a safety issue, which safety issue can be represented through the input value. In such a situation, the output value of the compiled program 12 and the diverse program 16 can be coupled together through a logical OR gate, such that activation of the output value at either the diverse program 16 or the compiled program 12 can activate the safety device. In this manner, fault tolerance can be achieved since a hardware and/or a software fault at either the compiled program 12 or the diverse program 16 would not cause a fault in both the compiled program 12 and the diverse program 16 such that the safety device would still be activated.

Figure 2:
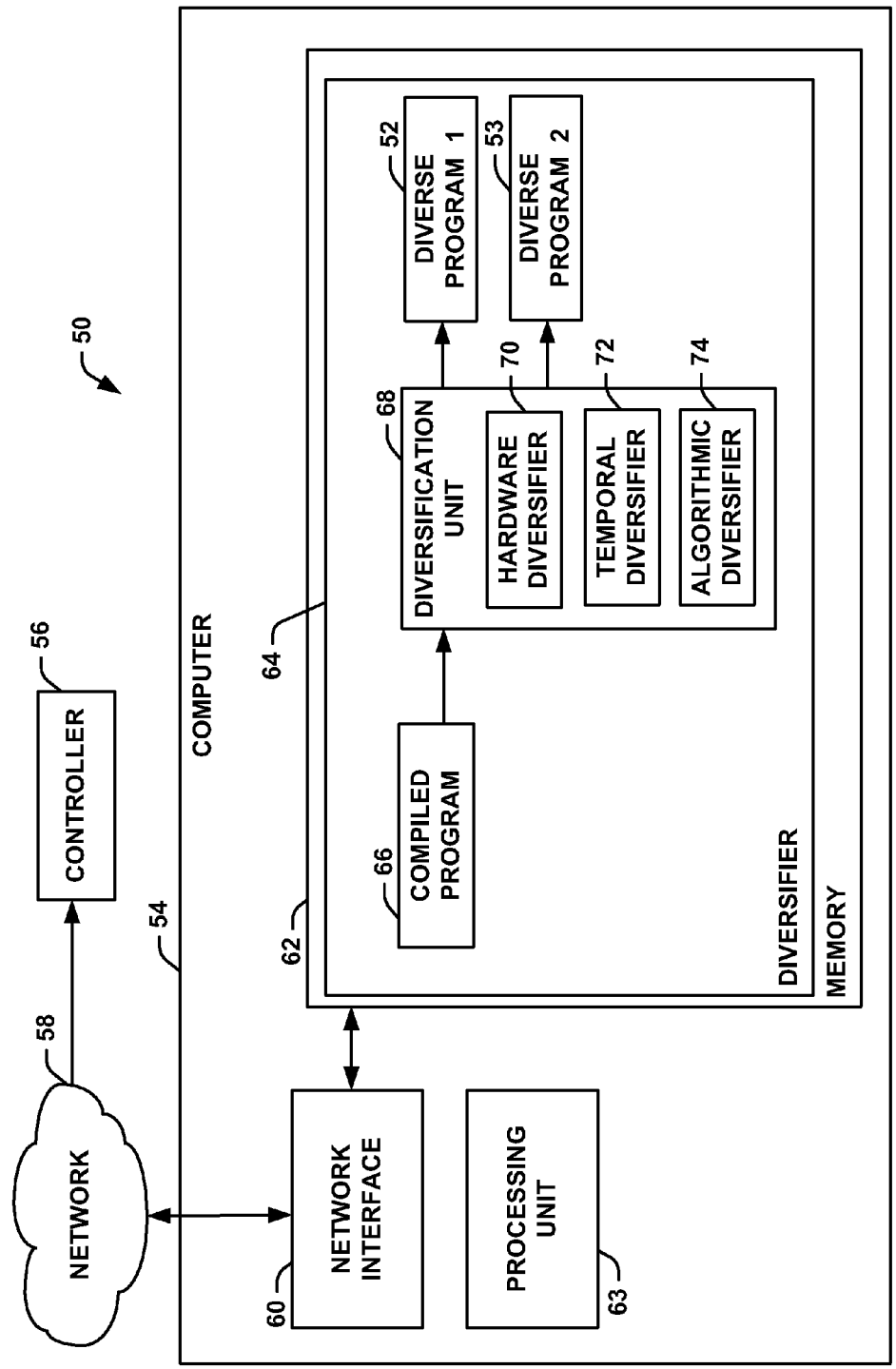
FIG. 2 illustrates an example of a system for implementing microdiversity.

FIG. 2 illustrates another example of a system 50 that can be employed to generate and utilize a first diverse program 52 (labeled in FIG. 2 as "DIVERSE PROGRAM 1") and a second diverse program 53 (labeled in FIG. 2 as "DIVERSE PROGRAM 2") by the employment of microdiversity. The system 50 can be implemented, for example, in a safety system. The system 50 can include a computer 54 that can communicate with a controller 56 over a network 58. The network 58 can be implemented, for example, as a public network (e.g., the Internet), a private network (e.g., a local area network) or as a combination thereof. Further, in some examples, the network 58 can be implemented as a direct connection (e.g., a serial port connection).

The computer 54 can include a network interface 60 for communicating on the network 58. The network interface 60 could be implemented, for example, as a network interface card or a serial port, such as a universal serial bus (USB) port. The computer 54 can include a memory 62 for storing machine readable instructions. The memory 62 could be implemented, for example, as non-transitory computer readable medium, such as volatile memory (e.g., RAM) nonvolatile memory (e.g., a hard disk drive, a solid-state drive, flash memory, etc.) or a combination thereof. The computer can also include a processing unit 63 configured to access the memory 62 and execute the machine readable instructions. The processing unit 63 can be implemented as a processor core. The memory 62 can include a diversifier 64 that can provide the first diverse program 52 and the second diverse program 53 over the network 58 to the controller 56.

The diversifier 64 can include a diversification unit 68 that can receive a compiled program 66. The compiled program 66 could be provided, for example, by the network 58. The compiled program 66 can be generated by a compiler. The compiled program 66 can be implemented as low level computer instructions, such as machine code instructions and/or assembly language instructions.

The diversification unit 68 can include a hardware diversifier 70 that can employ techniques to implement hardware diversification to generate the first diverse program 52 and the second diverse program 53. As explained herein, in some examples, the second diverse program 53 can be implemented with the same instructions as the compiled program 66, while in other examples; the second diverse program 53 can be implemented with different instructions than the compiled program 66. In one example, the hardware diversifier 70 can implement register reallocation and/or memory reallocation to implement the hardware diversification.

To implement register reallocation, the hardware diversifier 70 can parse the compiled program 66 to identify registers employed by each instruction in the compiled program 66. The hardware diversifier 70 can write new instructions for the first diverse program 52 based on the instructions in the compiled program 66, wherein the new instructions employ different registers than the instructions in the compiled program 66. In such a situation, the second diverse program 53 can be implemented as the compiled program 66. Moreover, in some examples, the diversification unit 68 can be configured to employ half of the available registers for each of the first diverse program 52 and the second diverse program 53. In such a situation, the diversification unit 68 can generate instructions for the first diverse program 52 that utilize another half of the available registers and generate instructions for the second diverse program 53 that utilized another half of the available registers. By employing hardware diversity, a non-transient failure in one register does not affect any single instruction in both the first diverse program 52 and the second diverse program 53, since both the first diverse program 52 and the second diverse program 53 would utilize mutually exclusive subsets of the available registers.

To implement memory reallocation, the hardware diversifier 70 can parse the compiled program 66 to identify memory locations employed to store data throughout the compiled program 66 and generate instructions for the first diverse program 52 that utilize different memory locations than those employed by the compiled program 66. In such a situation, the second diverse program 53 can be implemented as the compiled program 66. In this manner, the first diverse program 52 can be set to employ different memory locations for each unit of data as compared to the second diverse program 53. Accordingly, in the event of a common cause memory failure at a particular memory location, one of the first compiled program 52 and the second compiled program 53 would employ the memory at the particular memory location, while the other of first compiled program 52 and the second compiled program 53 would utilize memory at a different location, which different location would not have the common cause memory failure. In this manner, the other of the first compiled program 52 and the second compiled program 53 would execute correctly.

The diversification unit 68 can also include a temporal diversifier 72 that can employ techniques to implement temporal diversification to generate the first diverse program 52. In such a situation, the second diverse program 53 can be implemented as the compiled program 66. In one example, to implement temporal diversity, the diversification unit 68 can parse the compiled program 66 and can identify time-ordering sequences employed to perform a series of operations. The diversification unit 68 can generate instructions for the first diverse program 52 based on the identified time-order sequences that employ different time-ordering sequences to perform the same series of operations as the identified time-ordered sequences of the compiled program 66 to generate the first diverse program 52. By implementing temporal diversity, timing issues and/or race conditions resulting from asynchronous communication and/or design flaws in hardware components in addition to transient conditions in an input and output signal can be reduced or eliminated.

Further, the diversification unit 68 can include an algorithmic diversifier 74 that can implement algorithmic diversity in the first diverse program 52. In such a situation, the second diverse program 53 can be implemented as the compiled program 66. To implement algorithmic diversity, the algorithmic diversifier 74 can parse the compiled program 66 to identify processing logic and/or algorithms that perform a certain function. To generate the first diverse program 52, the algorithmic diversifier 74 can generate machine code or assembly language instructions that employ different processing logic and/or algorithms to perform the same function as the identified processing logic and/or algorithms of the compiled program 66. In some examples, algorithmic diversity can be a combination of hardware and temporal diversity.

In some examples, the algorithmic diversifier 74 can implement alternate procedure calling convention. To implement alternate procedure calling convention, the algorithmic diversifier 74 can identify instructions in the compiled program 66 that employ a calling convention to make procedure calls that specify a protocol for initializing argument values, preparing a call stack, and saving and/or restoring local data before and after the procedure call. To generate the instructions for the first diverse program 52, the algorithmic diversifier 74 can generate instructions that use an alternate calling convention, thereby causing the first diverse program 52 to utilize different registers for similar operations and to execute call initialization and finalization steps in different orders than the compiled program 66. In such a situation, the second diverse program 53 can be implemented as the compiled program 66. In this manner, the algorithmic diversifier 74 can achieve algorithmic diversity through a combination of hardware diversity and temporal diversity.

Moreover, in some examples, the algorithmic diversifier 74 can implement alternate pseudo-instructions to implement algorithmic diversity. To implement alternate pseudo-instructions, the algorithmic diversifier 74 can parse the compiled program 66 to identify common operations that require multiple atomic instructions, which can be referred to as pseudo-instructions. In such a situation, to generate the first diverse program 52, the algorithmic diversifier 74 can replace a pseudo-instruction with an alternate sequence of atomic instructions that utilize different registers and logic units and/or perform the atomic instructions corresponding to the pseudo-instructions in different orders. In this situation, the second diverse program 53 can be implemented as the compiled program 66. In this manner, the algorithmic diversifier 74 can achieve algorithmic diversity through a combination of hardware diversity and temporal diversity.

Further, in some examples, the algorithmic diversifier 74 can implement alternate procedure in-lining. To implement alternate procedure in-lining, the algorithmic diversifier 74 can parse the compiled program 66 to identify procedure calls in the compiled program 66 and generate instructions for the first diverse program 52 that employ an in-line proper subset of the procedure calls in the compiled program 66 to produce the first diverse program 52. In such a situation, the second diverse program 53 can be implemented as the compiled program 66. The employment of different usage or non-usage patterns of procedure call registers between the compiled program 66 and the first diverse program 52 could achieve hardware diversity, while the presence or absence of instructions to implement procedure calling conventions in the first diverse program 52 can achieve temporal diversity, thereby achieving algorithmic diversity through a combination of hardware diversity and temporal diversity.

Further still, in some examples, the algorithmic diversifier 74 can implement parallel resource reallocation. To implement parallel resource allocation, the algorithmic diversifier 74 can parse the compiled program 66 to identify instructions in the compiled program 66 that allocate operations to specific processing resources and/or instructions for structuring the code of the operations as multiple parallel streams. The algorithmic diversifier 74 can generate instructions for the first diverse program 52 that reallocate the parallel operations to different processing resources and/or modify the order operations that are executed on each processing resource thereby achieving algorithmic diversity through a combination of hardware and temporal diversity. In such a situation, the second diverse program 53 can be implemented as the compiled program 66.

Further yet still, the algorithmic diversifier 74 can implement algorithmic diversity through pattern recognition and replacement. To implement pattern recognition and replacement, the algorithmic diversifier 74 can parse the compiled program 66 to identify occurrences of predefined patterns in the compiled program 66 through the employment of pattern recognition. Moreover, to generate the first diverse program 52, the algorithmic diversifier 74 can replace the identified patterns with alternate implementations to achieve algorithmic diversity through a combination of hardware and temporal diversity. For instance, in one example, a given instruction in the compiled program 66 can be represented as Expression 1: A:=(B+C)*D. In such a situation, the given instruction can be replaced with another instruction for the first diverse program 52 that can be represented as Expression 2: A:=D*(B+C) or as Expression 3: A:=(D*B)+(D*C). As can be verified, Expressions 1, 2 and 3 have the same value of A for all values of B, C and D. However, in some examples, Expressions 2 and 3 can be implemented with a different set of machine code instructions or assembly language instructions than the set of instructions employed to implement Expression 1. In such a situation, the second diverse program 53 can be implemented as the compiled program 66.

Moreover, pattern recognition and replacement can protect against certain software design errors, such as arithmetic overflow. For instance, an instruction represented as Expression 4: K:=A+B−C may overflow if B or C are sufficiently large, thereby producing an erroneous result, while Expression 5: K=A−C+B may avoid an overflow in instances that C is sufficiently large.

Further, the algorithmic diversifier 74 can implement pattern recognition and replacement by identifying patterns in the compiled program 66. For example, Table 1 depicts an example that could represent a pattern of instructions in the compiled program 66 that can be implemented as a loop construct. In such a situation, the algorithmic diversifier 74 can generate a different loop for the first diverse program 52, for example, by rearranging the loop construct such that a loop test (labeled in TABLE 1 as "Branch statement to Label_2") is performed after a body of the loop rather than before the body of the loop.

TABLE 1

Label_1
Brach statement to Label_2
.... Series of statements
Unconditional branch statement to Label_1
Label_2

Furthermore, in some examples, the algorithmic diversifier 74 can implement library replacement to achieve algorithmic diversity. Software operations and/or procedures that are commonly performed in a particular domain can be captured in a reusable machine code or assembly language library for use by applications. To implement the library replacement, the algorithmic diversifier 74 can parse the compiled program 66 to identify procedure calls to a given library. In such a situation, to generate the first diverse program 52, the algorithmic diversifier 74 can replace the procedure calls to the given library with procedure calls to another library, wherein the procedure calls to the given and the other library perform the same function. In such a situation, the second diverse program 53 can be implemented as the compiled program 66.

By employment of the diversification unit 68, the first diverse program 52 and the second diverse program 43 can be generated automatically. Moreover, the diversification unit 68 can be programmed to provide hardware, temporal and/or algorithmic diversification between the compiled program 66 and the first diverse program 52 and the second diverse program 53. The compiled program 66 and the first diverse program 52 and the second diverse program 53 can be configured such that for a given input to both the compiled program 66 and the first diverse program 52 and the second diverse program 53, the same output is provided at both the first diverse program 52 and the second diverse program 53 under the presumption that no hardware errors and/or race conditions exist.

Further, the diversification unit 68 can communicate with the controller 56 over the network 58. The controller 56 can be implemented, for example, as a diverse controller. The controller 56 can employ the first diverse program 52 and the second diverse program 53 in a manner described herein to provide fault tolerance to a safety system. The system 50 can provide a cost efficient solution for generating the first diverse program 52 and the second diverse program 53, since the diversification unit 68 can generate the first diverse program 52 and the second diverse program 53 automatically. Moreover, further costs can be reduced since only one programming team would be needed to generate the compiled program 66, instead of having two different programming teams assigned to generated two different versions of the same program. Still further, the system 50 can ensure a greater degree of diversity between the first diverse program 52 and the second diverse program 53 than two different programming teams generating two different versions of the same program since the diversification unit 68 would not be prone to employing similar design biases and programming techniques as would be the case with the two different programming teams.

Figure 3:
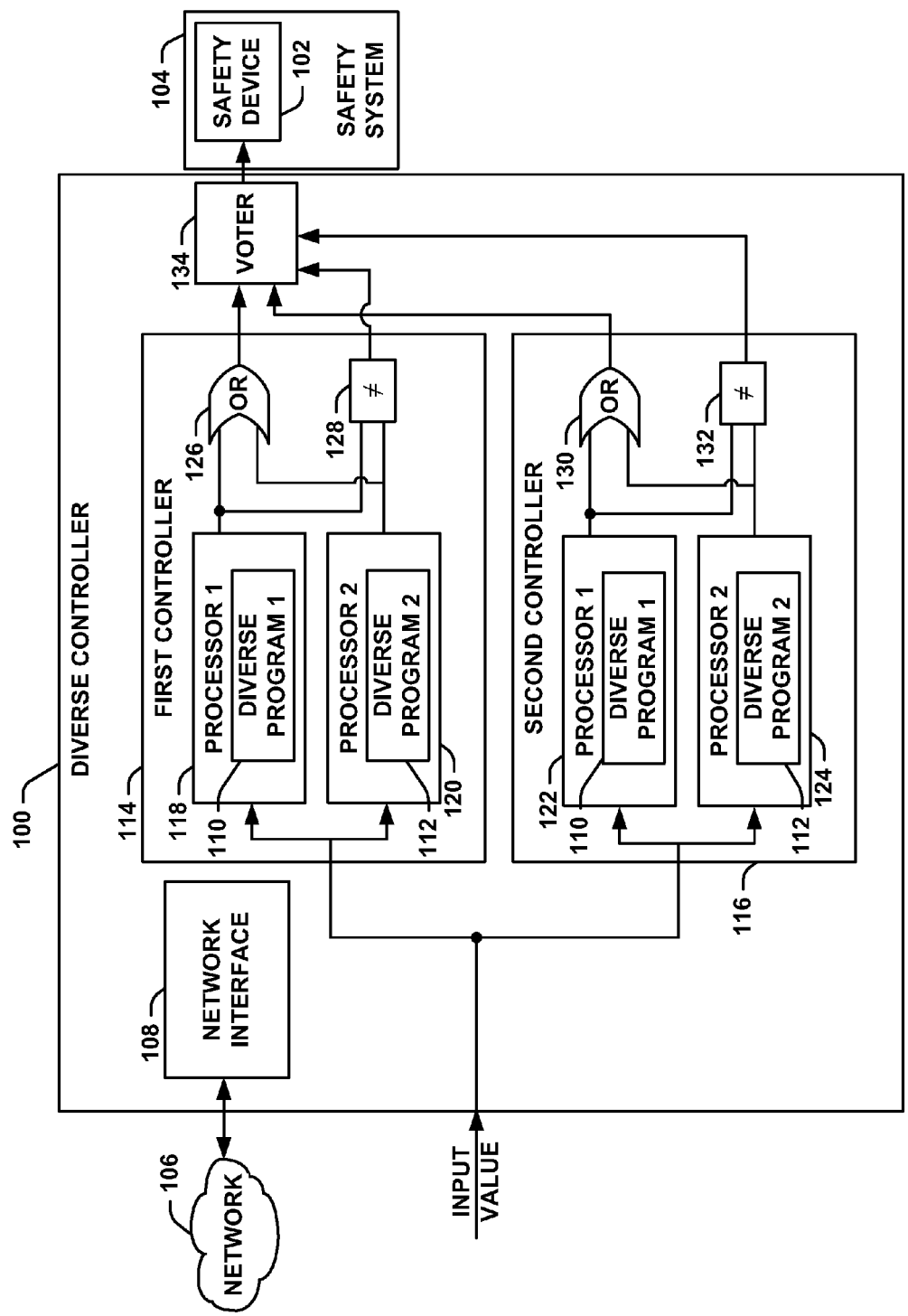
FIG. 3 illustrates an example of a controller for executing a diverse program and a compiled program.

FIG. 3 illustrates an example of a diverse controller 100 that can be employed, for example, to implement the controller 54 illustrated in FIG. 2. The diverse controller 100 can be implemented, for example, to control a safety device 102 in a safety system 104 were fault tolerance is needed. The diverse controller 100 can communicate on a network 106 (e.g., the network 58 illustrated in FIG. 2) via a network interface 108, such as a communications port (e.g., a network port, a serial port, a USB port, etc.). The diverse controller 100 can receive a first diverse program 110 (e.g., the first diverse program 52 illustrated in FIG. 2) and a second diverse program 112 (e.g., the second diverse program 53 illustrated in FIG. 2) via the network 106. As explained herein, the first diverse program 110 and the second diverse program 112 can be configured such that for a given input value, both the first diverse program 110 and the second diverse program 112 generate the same output value, but that the first diverse program 110 and the second program 112 have different, but related instructions in machine code or assembly language.

The diverse controller 100 can be implemented, for example, as a microcontroller, a field programmable gate array (FPGA), etc. The diverse controller 100 can include a first controller 114 and a second controller 116 that can operate in parallel. The first controller 114 can include a first processor 118 (labeled in FIG. 3 as "PROCESSOR 1") that operates in parallel with the second processor 120 (labeled in FIG. 3 as "PROCESSOR 2"). Moreover, each processor in the first controller 114 can execute a program. In the present example, the first processor 118 of the first controller 114 can execute the first diverse program 110 and the second processor 120 of the first controller 114 can execute the second diverse program 112. The second controller 116 can be implemented in a manner similar to the first controller 114, wherein a first processor 122 that executes the first diverse program 110 operates in parallel with a second processor 124 that executes the second diverse program 112. The first and second processors 118-124 of the first and second controllers 114 and 116 can each be implemented, for example, as a processor core.

It is noted that while in the example illustrated in FIG. 3, the first controller 114 and the second controller 116 are illustrated as having two processors, in some examples; a single processor (or FPGA) can be implemented to execute the first diverse program 110 and the second diverse program 112 concurrently. For instance, the first controller 114 and/or the second controller 116 can be implemented to execute two virtual processors. Accordingly, in some examples, the first processor 110 and/or the second processor 112 of the first and second controllers 114 and 116 can be implemented as virtual processor cores.

The diverse controller 100 can receive an input value. In some examples, the input value can represent an external environmental measurement, such as a temperature, a fluid level a status of the photo-eye, etc. For instance, in one example, the diverse controller 100 can be implemented to facilitate control of the safety system 104 of a nuclear reactor. In such a situation, the input value can represent a pressure of a containment structure of the nuclear reactor.

The input value can be provided to the first and second processors 118 and 120 of the first controller 114 and to the first and second processors 122 and 124 of the second controller 116. The first processor 118 of the first controller 114 and the first processor 122 of the second controller 116 can each execute the first diverse program 110 based on the input value. In a similar manner, the second processor 120 of the first controller 114 and the second processor 124 of the second controller 116 can execute the second diverse program 112 based on the input value. The first processor 118 of the first controller 114 can provide an output value to a logical OR gate 126 of the first controller 114 and to a comparator 128 of the first controller 114. In a similar manner, the second processor 120 of the first controller 114 can also provide an output value to the logical OR gate 126 of the first controller 114 and to the comparator 128 of the first controller 114. In a similar fashion, the first processor 122 of the second controller 116 can provide an output value to a logical OR gate 130 of the second controller 116 and to a comparator 132 of the second controller 116. Moreover, the second processor 124 of the second controller 116 can provide an output value to the logical OR gate 130 of the second controller 116 and to the comparator 132 of the second controller 116.

In one example, the output value provided by the first and second processors 118 and 120 of the first controller 114 and the first and second processors 122 and 124 of the second controller 116 can be implemented as an activation signal for the safety device 102, such as a solenoid attached to a relief valve. In such a situation, a logical value of '1' can indicate that the safety device 102 is to be actuated, while a logical value of '0' can indicate that the safety device 102 is not to be actuated. In the event that no hardware errors exist and no race conditions exist, the output value of the first and second processors 118-124 of the first controller 114 and the second controller 116 should be equal. The output of the logical OR gate 126 of the first controller 114 and the output of the logical OR gate 130 of the second controller 116 can be provided to a voter 134. The voter 134 can be coupled to a safety device 102, such as the aforementioned solenoid. In some examples, the safety device 102 could be implemented to activate the relief valve (via activation of the solenoid) in response to a certain pressure level threshold which corresponds to the input value received at the diverse controller 100.

The comparator 128 of the first controller 114 and comparator 132 of the second controller 116 can provide a health signal to the voter 134. The health signal provided by the first controller 114 can indicate whether or not the output of the first and second processors 118 and 120 of the first controller 114 are equal, while the health signal provided by the second controller 116 can indicate whether or not the output of the first and second processors 122 and 124 of the second controller 116 or equal.

In the above noted example, the output of the OR gate 126 of the first controller 114 can be set to '1' whenever either the first processor 118 or the second processor 120 of the first controller 114 provides an output value of 1. Similarly, the output of the OR gate 130 of the second controller 116 can be set to '1' whenever either the first processor 122 or the second processor 124 of the second controller 116 provides an output value of '1'. Moreover, in one example, the voter 134 can be configured to activate the safety device 102 in the event that the output of the OR gate 126 and 130 of both the first controller 114 and the second controller 116 is a logical '1' value, or if either of the first controller 114 or the second controller 116 is a logical value of '1' while the other of the first controller 114 and the second controller 116 provides a health signal indicating that the output of the associated first and second processors 118-124 are not equal.

By implementing the diverse controller 100 in this manner, the diverse controller 100 would still be able to operate the safety device 102 even in the event of a hardware failure at either the first controller 114 or the second controller 116. Since the diverse controller 100 can be implemented in a safety environment, the cost associated with an unnecessary activation of the safety device 102 is often lower than the cost associated with a failure to activate the safety device 102 when such activation is needed.

Figure 4:
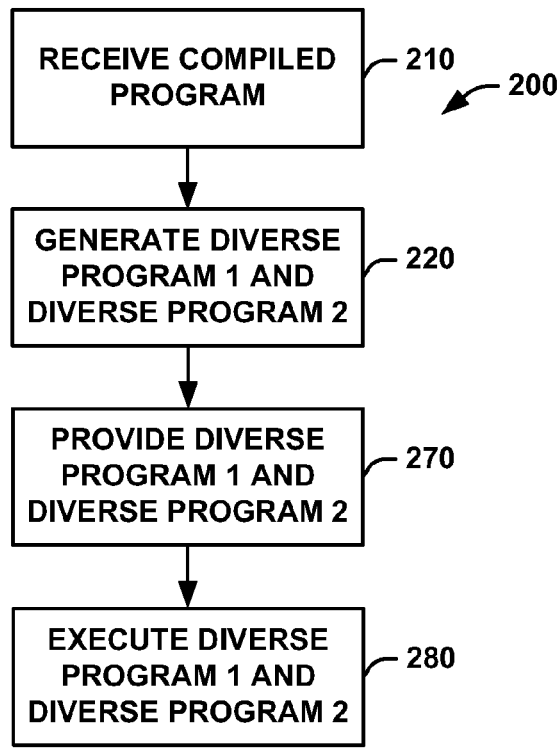
FIG. 4 illustrates an example of a flowchart of an example method for implementing microdiversity.
Figure 5:
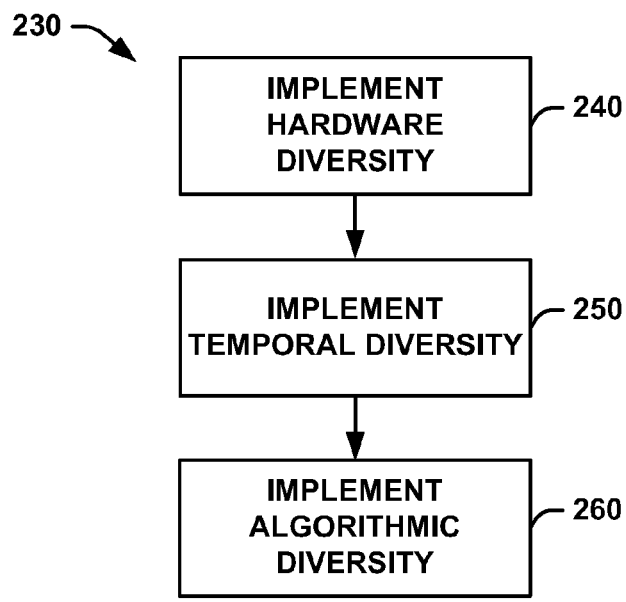
FIG. 5 illustrates an example of a flowchart of an example method for generating a diverse program.

In view of the foregoing structural and functional features described above, example methods will be better appreciated with reference to FIGS. 4 and 5. While, for purposes of simplicity of explanation, the example methods of FIGS. 4 and 5 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

FIG. 4 illustrates an example of a flow diagram depicting and example of a method 200 for implementing microdiversity. The method 200 could be implemented, for example, by the computer 4 illustrated FIG. 1 and/or the system 50 illustrated in FIG. 2. At 210, a compiled program can be received by a diversifier executing in memory of the computer. The compiled program can be provided, for example from a compiler. In such an example, the compiled program can be compile version of a computer program that was written in a high-level language, such as C++, C#, Java, Basic, etc. and compiled by a compiler. The compiled program can be implemented as machine code and/or as assembly language instructions that can be executed by a computer processor, such as a processor core, a microcontroller, an FPGA, etc.

At 220, a diversification unit of the diversifier can generate a first diverse program and a second diverse program. As explained herein, the first diverse program can be implemented as machine code and/or assembly language instructions and the diverse program operates in a manner similar to the compiled program and the second diverse program. In particular, the compiled program and the first diverse program and the second diverse program can be programmed such that the same output value is provided from both of the compiled program and the diverse program in response to the same input value. However, the first diverse program and the compiled program employ different instructions to manipulate and/or analyze data to produce the output value based on the input value. Moreover, as described herein, in some examples, the second diverse program can employ different instructions than the first program and the compiled program to manipulate and/or analyze the output value based on the input value. Further, in some examples, the second diverse program can be implemented as the compiled program.

FIG. 5 illustrates an example of a flow diagram for an example of a method 230 for generating a diverse program, such as the first and/or second diverse programs described in FIG. 4. The method 230 can be employed, for example, to implement the generating 220 in the method 200 illustrated in FIG. 4. At 240, the diversification unit can implement hardware diversity during generation of the diverse program. To implement hardware diversity, the diversification unit can, for example, implement memory and/or register reallocation to reallocate registers and/or RAM locations employed by each instruction of the compiled program to generate the instructions for the diverse program.

At 250, the diversification unit can implement temporal diversity during the generation of the diverse program. To implement temporal diversity, the diversification unit can parse the compiled program and can generate instructions for the diverse program that employ different time-ordering sequences to perform a different series of operations than those that are employed in the compiled program.

At 260, the diversification unit can implement algorithmic diversity during generation of the diverse program. To implement algorithmic diversity, the diversification unit can parse the compiled program and employ different processing logic and/or different algorithms to perform the same logical functions. In some examples, to implement algorithmic diversification, the diversification unit can implement alternate procedure calling, alternate pseudo-instructions, alternate procedure in-lining, parallel resource reallocation, pattern recognition and replacement, library replacement, etc. Moreover, algorithmic diversity can be a combination of hardware and temporal diversity.

Referring back to FIG. 4, at 270, the first diverse program and the second can be provided, for example, to a controller such as the controller 54 illustrated in FIG. 2 and/or the diverse controller 100 illustrated in FIG. 3. At 280, the first diverse program and the second diverse program can be executed concurrently by the controller. In some examples, the first diverse program and the second diverse program can be implemented to operate a safety device. Moreover, employment of both the first diverse program and the second diverse program can increase fault tolerance of the controller since malfunctions of the safety device caused by common cause hardware failures and/or race conditions can be reduced and/or eliminated.

Figure 6:
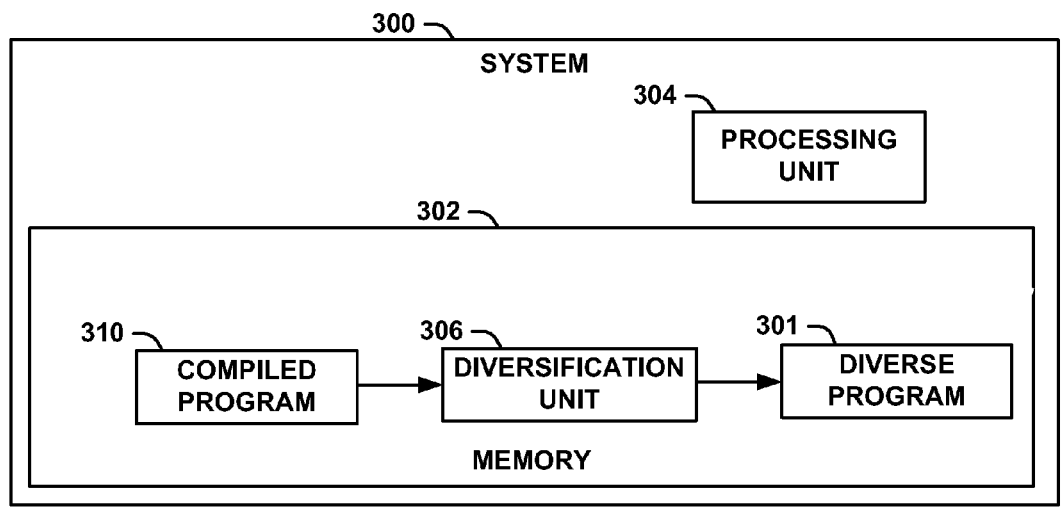
FIG. 6 illustrates another example of a system for generating a diverse program.

FIG. 6 illustrates an example of a system 300 for generating a diverse program 301. The system 300 can be employed, for example, to implement the computer 4 illustrated in FIG. 1 and/or the computer 54 illustrated in FIG. 2. The system 300 can include a memory 302 configured to store machine readable instructions. The system can also include a processing unit 304 configured to access the memory 302 and execute the machine readable instructions. The machine readable instructions can include a diversification unit 306 configured to generate the diverse program 301 including a given set of instructions implemented as machine code or assembly language instructions based on a compiled program 310. The compiled program 310 can include another set of instructions implemented as machine code or assembly language instructions. The diverse program 301 and the compiled program 310 can both be configured to provide a given output value in response to a given input value.

Figure 7:
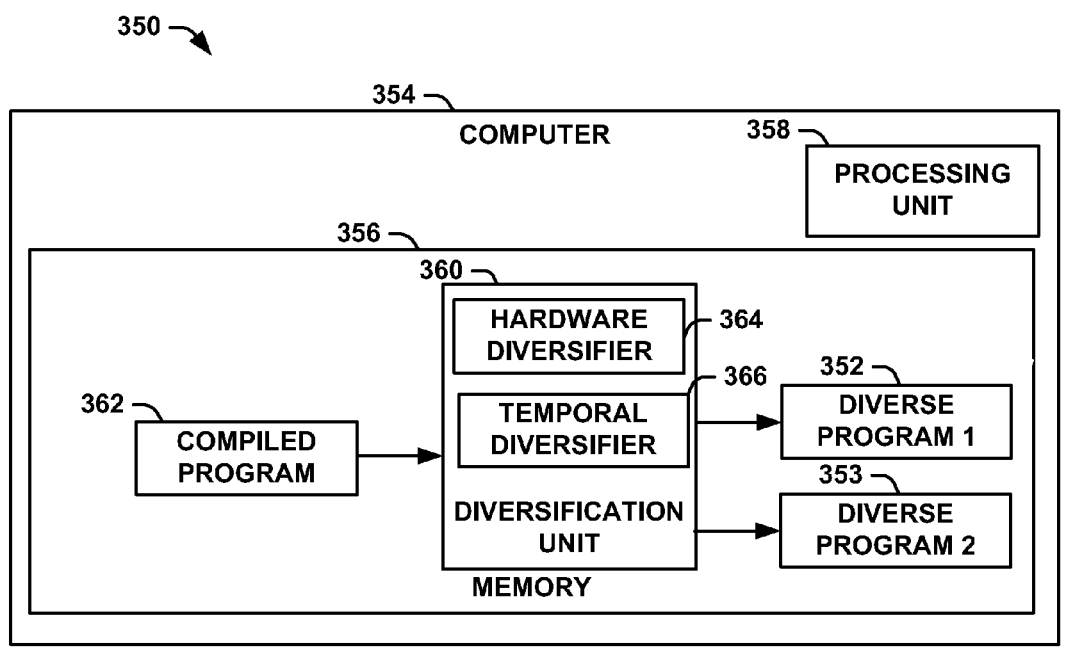
FIG. 7 illustrates yet another example of a system for generating a diverse program.

FIG. 7 illustrates another example of a system 350 for generating a first diverse program 352 and a second diverse program 353. The system 350 can be employed, for example, to implement the system 50 illustrated in FIG. 2. The system 350 can include a computer 354 that can include a memory 356 configured to store machine readable instructions. The computer 354 can also include a processing unit 358 configured to access the memory 356 and execute the machine readable instructions. The machine readable instructions can include a diversification unit 360 configured to generate the first diverse program 352 including a given set of instructions implemented as machine code or assembly language instructions based on a compiled program 362. The compiled program 362 can include an original set of instructions implemented as machine code or assembly language instructions. The diversification unit 360 can also be configured to generate the second diverse program 353 comprising another set of instructions implemented as machine code and/or assembly language instructions based on the compiled program 262. The diversification unit 360 can include a hardware diversifier 364 configured to generate a given instruction of the given set of instructions and the other set of instructions based on an instruction of the original set of instructions of the compiled program. The given instruction of the first diverse program and the instruction of the original set of instructions can be configured to perform the same function and access different registers and/or different memory locations. The diversification unit can also include a temporal diversifier configured to generate a given series of instructions of the given set of instructions and the other set of instructions based on an original series of instructions of the original set of instructions of the compiled program. The given series of instructions of the first diverse program and the original series of instructions can be configured to perform the same function with a different order of execution.

Figure 8:
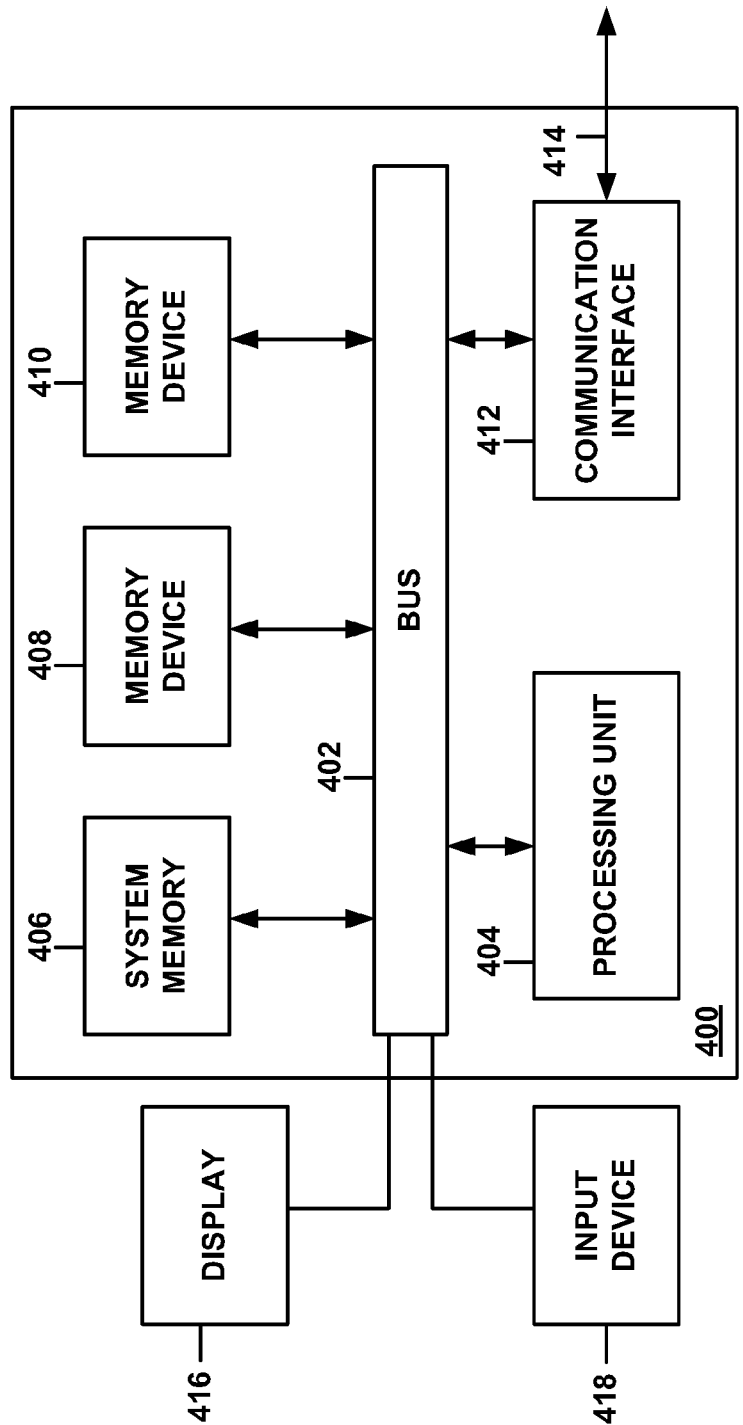
FIG. 8 illustrates an example of a computer system that can be employed to implement the systems and methods in FIGS. 1-7.

FIG. 8 is a schematic block diagram illustrating an example system 400 of hardware components capable of implementing examples disclosed in FIGS. 1-7, such as the computer 4 illustrated in FIG. 1 as well as portions of the system 50 illustrated in FIG. 2 and/or the controller 54 illustrated in FIG. 3. The system 400 can include various systems and subsystems. The system 400 can be a personal computer, a laptop computer, a workstation, a computer system, an appliance, an application-specific integrated circuit (ASIC), a server, a server blade center, a server farm, a mobile device, such as a smart phone, a personal digital assistant, an interactive television set, an Internet appliance, etc.

The system 400 can include a system bus 402, a processing unit 404, a system memory 406, memory devices 408 and 410, a communication interface 412 (e.g., a network interface), a communication link 414, a display 416 (e.g., a video screen), and an input device 418 (e.g., a keyboard and/or a mouse). The system bus 402 can be in communication with the processing unit 404 and the system memory 406. The additional memory devices 408 and 410, such as a hard disk drive, server, stand-alone database, or other non-volatile memory, can also be in communication with the system bus 402. The system bus 402 operably interconnects the processing unit 404, the memory devices 406-410, the communication interface 412, the display 416, and the input device 418. In some examples, the system bus 402 also operably interconnects an additional port (not shown), such as a universal serial bus (USB) port.

The processing unit 404 can be a computing device and can include an application-specific integrated circuit (ASIC). The processing unit 404 executes a set of instructions to implement the operations of examples disclosed herein. The processing unit can include a processor core.

The additional memory devices 406, 408 and 410 can store data, programs, instructions, database queries in text or compiled form, and any other information that can be needed to operate a computer. The memories 406, 408 and 410 can be implemented as computer-readable media (integrated or removable) such as a memory card, disk drive, compact disk (CD), or server accessible over a network. In certain examples, the memories 406, 408 and 410 can comprise text, images, video, and/or audio.

Additionally, the memory devices 408 and 410 can serve as databases or data storage and/or the memory 6 and 62 illustrated in FIGS. 1 and 2. Additionally or alternatively, the system 400 can access an external system (e.g., a web service) through the communication interface 412, which can communicate with the system bus 402 and the communication link 414.

In operation, the system 400 can be used to implement, for example, a diversifier (e.g., the diversifier 10 of FIG. 1 and/or the diversifier 64 of FIG. 2) that can execute a diversification unit (e.g., the diversification unit 14 of FIG. 1 and/or the diversification unit 68 of FIG. 2). Machine (e.g., computer) executable logic for implementing the system, such as the memory 6 of the computer 4 illustrated in FIG. 1 and or the memory 62 of the computer 54 illustrated in FIG. 2, can reside in the system memory 406, and/or in the memory devices 408 and/or 410 in accordance with certain examples. The processing unit 404 executes machine readable instructions originating from the system memory 406 and the memory devices 408 and 410. In such an example, the system memory 406 and/or the memory devices 408 and/or 410 could be employed, for example, to implement the memory 6 illustrated in FIG. 1 and/or the memory 62 illustrated in FIG. 2. The term "non-transitory computer readable medium" as used herein refers to a physical medium (e.g., memory) that participates in providing instructions to the processing unit 404 for execution.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims.

What is claimed is:

1. A system for generating a diverse program comprising:
a memory configured to store machine readable instructions; and
a processing unit configured to access the memory and execute the machine readable instructions, the machine readable instructions comprising:
a diversification unit configured to generate the diverse program comprising a given set of instructions implemented as machine code and/or assembly language instructions based on a compiled program, the compiled program comprising another set of instructions implemented as machine code and/or assembly language instructions, wherein the diverse program and the compiled program are both configured to provide a given output value in response to a given input value, wherein the given set of instructions of the diverse program and the other set of instructions of the compiled program have an equal number of instructions.

2. The system of claim 1, wherein the diversification unit further comprises a hardware diversifier configured to generate a given instruction of the given set of instructions for the diverse program based on another instruction of the another set of instructions for the compiled program, wherein the given instruction and the another instruction access different registers.

3. The system of claim 1, wherein the diversification unit further comprises a hardware diversifier configured to generate a given instruction of the given set of instructions for the diverse program based on another instruction of the another set of instructions for the compiled program, wherein the given instruction and the another instruction provide the same function and access different memory locations.

4. The system of claim 1, wherein the diversification unit further comprises a temporal diversifier configured to generate a given series of instructions of the given set of instructions for the diverse program based on another series of instructions of the another set of instructions for the compiled program, wherein the given series of instructions and the another series of instructions include the same instructions arranged to execute in different orders.

5. The system of claim 1, wherein the diversification unit further comprises an algorithmic diversifier configured to implement alternate procedure calling by generating a given series of instructions of the given set of instructions for the diverse program based on another series of instructions of the another set of instructions for the compiled program, wherein the given series of instructions and the another set of instructions provide the same function and access different registers and have different instruction orders.

6. The system of claim 1, wherein the diversification unit further comprises an algorithmic diversifier configured to implement alternate pseudo-instructions by generating a given series of atomic instructions of the given set of instructions for the diverse program based on a pseudo-instruction of the another set of instructions for the compiled program, wherein the given series of atomic instructions and the pseudo-instruction of the another set of instructions provide the same function and access different registers and have different instruction orders, wherein the pseudo-instruction comprises another series of atomic instructions.

7. The system of claim 1, wherein the diversification unit further comprises an algorithmic diversifier configured to implement parallel resource reallocation by generating a given series of instructions of the given set of instructions for the diverse program based on another series of instructions of the another set of instructions for the compiled program, wherein the given series of instructions and the another series instructions provide the same function, access different processing resources and have different orders of execution.

8. The system of claim 1, wherein the diversification unit further comprises an algorithmic diversifier configured to implement pattern recognition and replacement by generating a given instruction of the given set of instructions for the diverse program based on another instruction of the another set of instructions for the compiled program, wherein the given instruction and the another instruction have a different logical operation that provide the same function.

9. The system of claim 1, wherein the diversification unit further comprises an algorithmic diversifier configured to implement pattern recognition and replacement by generating a given instruction loop of the given set of instructions for the diverse program based on another instruction loop of the another set of instructions for the compiled program, wherein the given instruction loop and the another instruction loop provide the same function and have differing orders of operation for a respective loop test in relation to a respective body of a loop.

10. A system for generating a diverse program comprising:
a memory configured to store machine readable instructions; and
a processing unit configured to access the memory and execute the machine readable instructions, the machine readable instructions comprising:
a diversification unit configured to generate the diverse program comprising a given set of instructions implemented as machine code and/or assembly language instructions based on a compiled program, the compiled program comprising another set of instructions implemented as machine code and/or assembly language instructions, wherein the diverse program and the compiled program are both configured to provide a given output value in response to a given input value;
wherein the diversification unit further comprises an algorithmic diversifier configured to implement library replacement by generating a given instruction of the given set of instructions for the diverse program based on another instruction of the another set of instructions for the compiled program, wherein the given instruction includes a procedure call to a given library to perform a given function and the another instruction includes a procedure call to another library to perform the given function.

11. The system of claim 1, wherein the compiled program and the diverse program are configured to control a safety device.

12. A system for generating a first diverse program and a second diverse program comprising:
a computer comprising:
a memory configured to store machine readable instructions; and
a processing unit configured to access the memory and execute the machine readable instructions, the machine readable instructions comprising:
a diversification unit configured to generate the first diverse program comprising a given set of instructions implemented as machine code and/or assembly language instructions based on a compiled program, the compiled program comprising an original set of instructions implemented as machine code and/or assembly language instructions, and diversification unit being configured to generate the second diverse program comprising another set of instructions implemented as machine code and/or assembly language instructions based on the compiled program, the diversification unit comprising:
a hardware diversifier configured to generate a given instruction of the given set of instructions and the another set of instructions based on an instruction of the original set of instructions of the compiled program, wherein the given instruction of the first diverse program and the instruction of the original set of instructions are configured to perform the same function and access different registers and/or different memory locations; and
a temporal diversifier configured to generate a given series of instructions of the given set of instructions and the another set of instructions based on an original series of instructions of the different set of instructions of the compiled program, wherein the given series of instructions and the another series of instructions are configured to perform the same function with a different order of execution.

13. The system of claim 12, wherein the compiled program, the first diverse program and the second diverse program each provide a given output value in response to a given input value.

14. The system of claim 13, wherein the diversification unit wherein the second diverse program and the compiled program are the same program.

15. The system of claim 13, wherein the first diverse program and the second diverse program are configured to operate a safety device.

16. The system of claim 15, further comprising a controller configured to execute the first diverse program and the second diverse program concurrently.

17. A non-transitory computer readable medium having instructions executable by a processor for performing a method, the method comprising:
generating a diverse program based on a compiled program, wherein the diverse program and the compiled program each comprise instructions implemented as machine code instructions and/or assembly language instructions, wherein the diverse program and the compiled program are configured to provide a given output value in response to a given input value, wherein the compiled program and the diverse program have different instructions and an equal number of instructions.

18. A non-transitory computer readable medium having instructions executable by a processor for performing a method, the method comprising:
generating a diverse program based on a compiled program, wherein the diverse program and the compiled program each comprise instructions implemented as machine code instructions and/or assembly language instructions, wherein the diverse program and the compiled program are configured to provide a given output value in response to a given input value, wherein the compiled program and the diverse program have different instructions; and generating a second diverse program based on the compiled program wherein the generating further comprises implementing hardware diversity between the first diverse program and the second diverse program, such that a given instruction in the second diverse program is generated based on an original instruction in the compiled program and based on another instruction in the first diverse program, wherein the given instruction in the second diverse program and the another instruction in the first diverse program are configured to perform the same function and access a different register and/or a different memory location.

19. The non-transitory computer readable medium of claim 17, wherein the generating further comprises implementing temporal diversity between the diverse program and the compiled program, such that the diverse program and the compiled program are configured to execute a set of instructions in different orders.

20. The non-transitory computer readable medium of claim 17, wherein the generating further comprises implementing algorithmic diversity between the diverse program and the compiled program, such that a given series of instructions of the diverse program provides the same function as another series of instructions in the compiled program, wherein the given series of instructions is configured to execute in a different order than the another series of instructions and the given series of instructions is configured to access a different register and/or memory location than the another series of instructions.

* * * * *